United States Patent
Li et al.

(10) Patent No.: US 10,159,080 B2
(45) Date of Patent: Dec. 18, 2018

(54) RANDOM ACCESS METHOD AND APPARATUS AND SYSTEM

(71) Applicant: FUJITSU LIMITED, Kawasaki-shi, Kanagawa (JP)

(72) Inventors: Hongchao Li, Beijing (CN); Hua Zhou, Beijing (CN); Jianming Wu, Beijing (CN)

(73) Assignee: Fujitsu Limited, Kawasaki-shi (JP)

( * ) Notice: Subject to any disclaimer, the term of this patent is extended or adjusted under 35 U.S.C. 154(b) by 60 days.

(21) Appl. No.: 14/789,208

(22) Filed: Jul. 1, 2015

(65) Prior Publication Data
US 2015/0305014 A1 Oct. 22, 2015

Related U.S. Application Data

(63) Continuation of application No. PCT/CN2013/070637, filed on Jan. 17, 2013.

(51) Int. Cl.
*H04W 72/04* (2009.01)
*H04W 74/00* (2009.01)
(Continued)

(52) U.S. Cl.
CPC ......... *H04W 72/048* (2013.01); *H04J 3/1694* (2013.01); *H04L 1/00* (2013.01);
(Continued)

(58) Field of Classification Search
None
See application file for complete search history.

(56) References Cited

U.S. PATENT DOCUMENTS 9,124,451 B2  9/2015 Tsuchida
9,179,416 B2  11/2015 Suzuki et al.
(Continued)

FOREIGN PATENT DOCUMENTS

CN  101483919 A  7/2009
CN  101686547 A  3/2010
(Continued)

OTHER PUBLICATIONS

Partial Supplementary European Search Report issued for corresponding European patent application No. 13872246.7 dated Sep. 14, 2016.
(Continued)

*Primary Examiner* — Steven H Nguyen
(74) *Attorney, Agent, or Firm* — Myers Wolin, LLC

(57) ABSTRACT

Embodiments of the present invention provide a random access method and apparatus and system. Where, the method includes: selecting randomly, by UE, a physical random access channel (PRACH) resource for transmitting a preamble from multiple PRACH resources pre-configured by an eNB for the UE; and transmitting the preamble by the UE on a selected PRACH resource, so that the eNB transmits a random access response to UE to which a correctly demodulated preamble corresponds according to preambles transmitted by UEs. With the method and apparatus of the embodiments of the present invention, coverage performance of an uplink channel and a downlink channel may be improved.

11 Claims, 6 Drawing Sheets

301 transmitting multiple preambles by UE within one or more TTIs; wherein PRACH resources used by the preambles hop in a frequency domain

302 detecting a random access response by the UE in a time window to which each of the preambles corresponds

(51) Int. Cl.
  *H04L 1/00*     (2006.01)
  *H04L 5/00*     (2006.01)
  *H04J 3/16*     (2006.01)
  *H04L 5/14*     (2006.01)
  *H04W 4/18*     (2009.01)
  *H04W 72/02*    (2009.01)
  *H04W 74/08*    (2009.01)
  *H04W 88/02*    (2009.01)

(52) U.S. Cl.
  CPC ............ *H04L 5/008* (2013.01); *H04L 5/0048* (2013.01); *H04L 5/0094* (2013.01); *H04L 5/14* (2013.01); *H04W 4/18* (2013.01); *H04W 74/002* (2013.01); *H04W 72/02* (2013.01); *H04W 72/044* (2013.01); *H04W 74/0833* (2013.01); *H04W 88/02* (2013.01)

(56) References Cited

U.S. PATENT DOCUMENTS

| | | | |
|---|---|---|---|
| 2009/0109912 A1* | 4/2009 | DiGirolamo | H04L 5/0053 370/329 |
| 2009/0156194 A1 | 6/2009 | Meylan | |
| 2009/0180436 A1* | 7/2009 | Vujcic | H04L 5/0091 370/330 |
| 2009/0196230 A1* | 8/2009 | Kim | H04W 74/002 370/328 |
| 2009/0316638 A1* | 12/2009 | Yi | H04W 74/002 370/329 |
| 2010/0113051 A1* | 5/2010 | Du | H04W 72/1278 455/450 |
| 2010/0142470 A1* | 6/2010 | Park | H04L 1/188 370/329 |
| 2010/0296467 A1* | 11/2010 | Pelletier | H04W 74/002 370/329 |
| 2010/0331003 A1* | 12/2010 | Park | H04W 74/0866 455/450 |
| 2011/0013542 A1* | 1/2011 | Yu | H04W 74/006 370/280 |
| 2011/0014922 A1* | 1/2011 | Jen | H04W 74/002 455/450 |
| 2011/0170503 A1* | 7/2011 | Chun | H04W 74/006 370/329 |
| 2011/0274040 A1* | 11/2011 | Pani | H04W 4/005 370/328 |
| 2012/0008575 A1* | 1/2012 | Vujcic | H04W 74/002 370/329 |
| 2012/0026952 A1* | 2/2012 | Okubo | H04W 74/008 370/329 |
| 2012/0076042 A1* | 3/2012 | Chun | H04W 72/042 370/252 |
| 2012/0076104 A1* | 3/2012 | Chun | H04W 72/042 370/329 |
| 2012/0113938 A1 | 5/2012 | Larsson et al. | |
| 2012/0213151 A1* | 8/2012 | Zhao | H04W 74/006 370/328 |
| 2012/0218987 A1* | 8/2012 | Zhao | H04W 56/0005 370/350 |
| 2012/0281566 A1* | 11/2012 | Pelletier | H04W 76/046 370/252 |
| 2012/0300715 A1* | 11/2012 | Pelletier | H04W 56/0005 370/329 |
| 2012/0314652 A1* | 12/2012 | Ahn | H04W 74/085 370/328 |
| 2013/0114515 A1* | 5/2013 | Koo | H04J 11/0023 370/329 |
| 2013/0301541 A1* | 11/2013 | Mukherjee | H04W 74/0833 370/329 |

FOREIGN PATENT DOCUMENTS

| | | |
|---|---|---|
| CN | 101904212 A | 12/2010 |
| JP | 2010-098707 A | 4/2010 |
| JP | 2010-183287 A | 8/2010 |
| JP | 2012-235328 A | 11/2012 |
| JP | 2012-244378 A | 12/2012 |
| JP | 2013-005367 A | 1/2013 |
| JP | 2014-513470 A | 5/2014 |
| WO | 2012/027887 A1 | 3/2012 |
| WO | 2012/138759 A1 | 10/2012 |

OTHER PUBLICATIONS

International Preliminary Report on Patentability with Written Opinion of the International Searching Authority for corresponding International Patent Application No. PCT/CN2013/070637 dated Jul. 30, 2015 with English translation.
First Office Action issued for corresponding Japanese Patent Application No. 2015-552964 dated Aug. 16, 2016 with an English translation.
NEC, "Allocation of RACH resource", Agenda Item: 05.01.01.03—Random Access, 3GPP TSG-RAN WG2 Meeting #59bis, R2-073951, Shanghai, China, Oct. 8-12, 2007.
International Search Report issued for corresponding International Patent Application No. PCT/CN2013/070637, dated Nov. 14, 2013, with an English translation.
Extended European search report with supplementary European search report and the European search opinion issued by the European Patent Office for corresponding European Patent Application No. 13872246.7, dated Dec. 22, 2016.
Notice of Preliminary Rejection issued by the Korean Intellectual Property Office for corresponding Korean Patent Application No. 10-2015-7019554, dated Nov. 2, 2016, with English translation.
Notice of Preliminary Rejection issued for corresponding Korean Patent Application No. 10-2015-7019554, dated Apr. 20, 2017, with an English translation.
Third Notification of Office Action issued by the State Intellectual Property Office of China for corresponding Chinese Patent Application No. 201380066477.3, dated Jul. 12, 2018, with an English translation.

* cited by examiner

RANDOM ACCESS METHOD AND APPARATUS AND SYSTEM

CROSS REFERENCE TO RELATED APPLICATIONS

This application is a continuation application of International Application PCT/CN2013/070637 filed on Jan. 17, 2013, the entire contents of which are incorporated herein by reference.

TECHNICAL FIELD

The present invention relates to the field of wireless communications, and in particular to a random access method and apparatus and system.

BACKGROUND

Machine-type communication (MTC) is a technology important to income and services of operators, which may use a large amount of low-cost fixed terminals to provide various application services, such as data report of a water meter, an ammeter, and a gas meter, etc., safety monitoring, and public security, etc., via autonomous communication between machines.

It was found by the inventors in the implementation of the present invention that on the one hand, the number of users and the number of terminals having cellular communication modules will increase along with applications and services provided by a cellular network system, the number of MTC users is closely related to various meters and monitoring systems, and this is a typical example; all resources of the system are extremely important to service provision, which is possible to lower allocation efficiency. And on the other hand, an important characteristic of an MTC terminal is that it is possible to be mounted indoors with a relatively high level of separation from the outside, such as in a basement, thereby resulting in relatively high pathloss of a wireless link from the MTC terminal to an eNB. High pathloss increases difficulty of coverage of users and signal reception performance. Hence, ensuring coverage performance of uplink channels and downlink channels on the premise of keeping low cost of an MTC terminal is a problem needing to be solved.

It should be noted that the above description of the background is merely provided for clear and complete explanation of the present invention and for easy understanding by those skilled in the art. And it should not be understood that the above technical solution is known to those skilled in the art as it is described in the background of the present invention.

SUMMARY

An object of the embodiments of the present invention is to provide a random access method and apparatus and system, so as to solve the problem proposed in the Background.

According to a first aspect of the embodiments of the present invention, there is provided a random access method, including:

selecting randomly, by UE, a physical random access channel (PRACH) resource for transmitting a preamble from multiple PRACH resources pre-configured by an eNB for the UE; and transmitting the preamble by the UE on a selected PRACH resource, so that the eNB transmits a random access response to UE to which a correctly demodulated preamble corresponds according to preambles transmitted by UEs.

According to a second aspect of the embodiments of the present invention, there is provided a random access method, including:

receiving, by UE, UE-specific signaling transmitted by an eNB, the UE-specific signaling including time frequency position information of one PRACH resource configured by the eNB for the UE; and transmitting a preamble by the UE on the PRACH resource, so that the eNB transmits a random access response to UE to which a correctly demodulated preamble corresponds according to preambles transmitted by UEs.

According to a third aspect of the embodiments of the present invention, there is provided a random access method, including:

configuring multiple PRACH resources by an eNB for all or part of UEs in a cell, so that each of the UEs randomly selects one of the multiple PRACH resources to transmit a preamble of its own; and demodulating and detecting, by the eNB in all possible PRACH resources, the preambles transmitted by the UEs, and transmitting a random access response to UE to which a correctly demodulated preamble corresponds.

According to a four aspect of the embodiments of the present invention, there is provided a random access method, including:

transmitting multiple preambles by UE within one or more TTIs; wherein PRACH resources used by the preambles hop in a frequency domain; and detecting a random access response by the UE in a time window to which each of the preambles corresponds.

According to a fifth aspect of the embodiments of the present invention, there is provided a random access method, including:

receiving, by an eNB, multiple preambles transmitted by UE within one or more TTIs, wherein PRACH resources used by the preambles hop in a frequency domain;

performing combined demodulation by the eNB by using the multiple preambles or a part of the multiple preambles; and transmitting a random access response by the eNB to UE to which a correctly demodulated preamble corresponds.

According to a sixth aspect of the embodiments of the present invention, there is provided user equipment (UE), applicable to performing random access, the UE including:

a selecting unit configured to randomly select a PRACH resource for transmitting a preamble from multiple PRACH resources pre-configured by an eNB for the UE; and a transmitting unit configured to transmit the preamble on the PRACH resource selected by the selecting unit, so that the eNB transmits random access response to UE to which a correctly demodulated preamble corresponds according to preambles transmitted by UEs.

According to a seventh aspect of the embodiments of the present invention, there is provided user equipment (UE), applicable to performing random access, the UE including:

a receiving unit configured to receive UE-specific signaling transmitted by an eNB, the UE-specific signaling including time frequency position information of one PRACH resource pre-configured by the eNB for the UE; and a transmitting unit configured to transmit a preamble on the PRACH resource, so that the eNB transmits a random access response to UE to which a correctly demodulated preamble corresponds according to preambles transmitted by UEs.

According to an eighth aspect of the embodiments of the present invention, there is provided an eNB, applicable to controlling random access, the eNB including:

a configuring unit configured to configure multiple PRACH resources for all or part of UEs in a cell to which the eNB belongs, so that each of the UEs randomly selects one of the multiple PRACH resources to transmit preamble of its own; and a processing unit configured to demodulate and detect the preambles transmitted by the UEs in all possible PRACH resources configured by the configuring unit for the UEs; and a transmitting unit configured to transmit a random access response to UE to which a preamble correctly demodulated by the processing unit corresponds.

According to a ninth aspect of the embodiments of the present invention, there is provided user equipment (UE), applicable to performing random access, the UE including:

a transmitting unit configured to transmit multiple preambles within one or more TTIs, wherein PRACH resources used by the preambles hop in a frequency domain; and a detecting unit configured to detect a random access response in a time window to which each of the preambles corresponds.

According to a tenth aspect of the embodiments of the present invention, there is provided an eNB, applicable to controlling random access, the eNB including:

a receiving unit configured to receive multiple preambles transmitted by UE within one or more TTIs, wherein PRACH resources used by the preambles hop in a frequency domain;

a demodulating unit configured to perform combined demodulation by using the multiple preambles received by the receiving unit or a part of the multiple preambles; and a transmitting unit configured to transmit a random access response to UE to which a preamble correctly demodulated by the demodulating unit corresponds.

According to an eleventh aspect of the embodiments of the present invention, there is provided a communication system, including the UE as described in the sixth or seventh aspect and the eNB as described in the eighth aspect, or including the UE as described in the ninth aspect and the eNB as described in the tenth aspect.

According to another aspect of the embodiments of the present invention, there is provided a computer-readable program, wherein when the program is executed in terminal equipment, the program enables a computer to carry out the random access method as described in any one of the first, second and fourth aspects in the terminal equipment.

According to a further aspect of the embodiments of the present invention, there is provided a storage medium in which a computer-readable program is stored, wherein the computer-readable program enables a computer to carry out the random access method as described in any one of the first, second and fourth aspects in terminal equipment.

According to still another aspect of the embodiments of the present invention, there is provided a computer-readable program, wherein when the program is executed in an eNB, the program enables a computer to carry out the random access method as described in either one of the third and fifth aspects in the eNB.

According to yet another aspect of the embodiments of the present invention, there is provided a storage medium in which a computer-readable program is stored, wherein the computer-readable program enables a computer to carry out the random access method as described in either one of the third and fifth aspects in an eNB.

Advantages of the embodiments of the present invention exist in that on the one hand, allocation efficiency is improved; and on the other hand, coverage performance of uplink channels and downlink channels of the terminal equipment is ensured.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated or reduced in size. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment. In the drawings.

DETAILED DESCRIPTION OF THE INVENTION

The foregoing and other features of the embodiments of the present invention shall become apparent with reference to the drawings and the following description. These embodiments are illustrative only, and are not intended to limit the present invention. For the principle and modes of implementation of the present invention to be easily understood by those skilled in the art, the implementations of the present invention shall be described taking random access of UE in a machine-type communication system as an example. However, it should be understood that the present invention is not limited to the above system, and is applicable to other systems related to random access.

Embodiment 1

Figure 1:
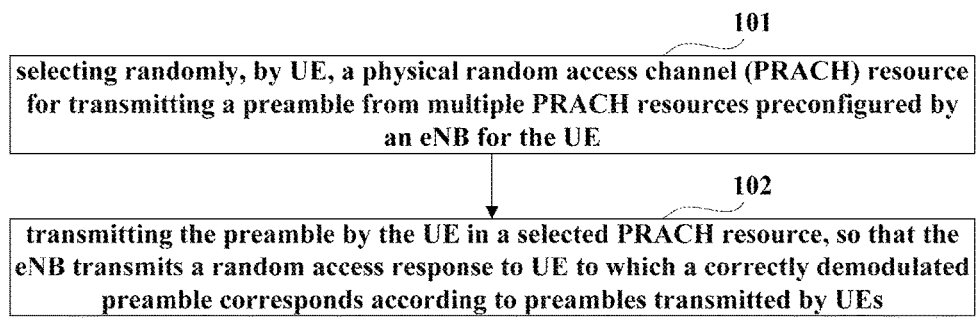
FIG. 1 is a flowchart of a random access method of Embodiment 1 of the present invention.

An embodiment of the present invention provides a random access method. FIG. 1 is a flowchart of the method. Referring to FIG. 1, the method includes:

step 101: selecting randomly, by UE, a physical random access channel (PRACH) resource for transmitting a preamble from multiple PRACH resources preconfigured by an eNB for the UE;

wherein, the multiple PRACH resources may be in the same TTI, and may also be in multiple different TTIs, and this embodiment is not limited thereto; and wherein, each of the PRACH resources corresponds to multiple consecutive PRBs, such as 6 PRBs, in a frequency domain, and corresponds to a certain specific subframe or some specific subframes in a time domain;

step 102: transmitting the preamble by the UE on a selected PRACH resource, so that the eNB transmits a random access response to UE to which a correctly demodulated preamble corresponds according to preambles transmitted by UEs.

In an implementation of this embodiment, the eNB pre-configures multiple PRACH resources for a part of UEs (such as all MTC UEs, or a part of common UEs, or a combination of a part of common UEs and a part of MTC UEs, or a combination of a part of common UEs and all of MTC UEs, etc.) in a cell to which it belongs, and transmits time frequency position information of the multiple PRACH resources to each UE via UE-specific configuration signaling; or multiple defaulted PRACH resources are agreed at the eNB side and the UE side. With such an implementation, in a process of initiating random access by the UE, if configuration of the above multiple PRACH resources is transmitted via configuration signaling, the UE will receive the configuration signaling, the configuration signaling including time frequency position information of the multiple PRACH resources pre-configured by the eNB for the UE, then the UE will randomly select a PRACH resource from the above pre-configured multiple PRACH resources, and transmit the preamble on a selected PRACH resource; and if the above multiple PRACH resources are agreed by the eNB and the UE, in the process of initiating random access by the UE, the UE will randomly select a PRACH resource from the multiple agreed PRACH resources, and transmit the preamble on a selected PRACH resource.

In another implementation of this embodiment, the eNB may first group the UEs in the cell to which it belongs (which may be all the UEs, and may also be the part of the UEs mentioned in the preceding implementation), and then allocate one or multiple PRACH resources for each group of UEs. Wherein, the PRACH resources allocated for each group of UEs may be identical or different, and may have an intersection or have no intersection. Similar to the preceding implementation, such configuration may also be transmitted via UE-specific signaling, or may be agreed by the eNB and the UE. With this implementation, in the process of initiating random access by the UE, if the eNB allocates only one PRACH resource for the group to which the UE belongs, the UE transmits the preamble on the PRACH resource; and if the eNB allocates multiple PRACH resources for the group to which the UE belongs, similar to the preceding implementation, the UE may randomly select a PRACH resource from the multiple PRACH resources, and then transmit the preamble by using a selected PRACH resource.

In this embodiment, after the UE transmits the preamble by using the method of this embodiment, the eNB may demodulate and detect preambles transmitted by UEs in all possible PRACH resources configured by it for the UEs, and transmit a random access response (RAR) to UE to which a correctly demodulated preamble corresponds. Wherein, the eNB needs to calculate a random access radio network temporary identifier (RA-RNTI) according to the PRACH resource used by the preamble, performs CRC attachment on a PDCCH by using the RA-RNTI, and then transmits the random access response in a PDSCH scheduled by the PDCCH. A detailed transmission process is identical to that of the prior art, and shall not be described herein any further.

In this embodiment, after the UE transmits the preamble by using the method of this embodiment, the RA-RNTI needs also to be used to monitor the PDCCH, that is, performing CRC de-attachment on the PDCCH, so as to detect the RAR within a time window to which the preamble corresponds. In this embodiment, the RA-RNTI used by the UE is identical to that used by the eNB, which are all functions $f(fi, ti)$ corresponding to time frequency resources (PRACH resources) of the preamble. And wherein, the monitoring time window and the monitoring process are identical to those of the prior art, and shall not be described herein any further.

With the method of this embodiment, the UE transmits the preamble in the multiple PRACH resources configured by the eNB for it, thereby solving the problem of high load pointed out in the Background; and the eNB is able to decide an amount of PRACH resources allocated by it for the UE as needed, thereby lowering a collision probability between different UEs.

Embodiment 2

Figure 2:
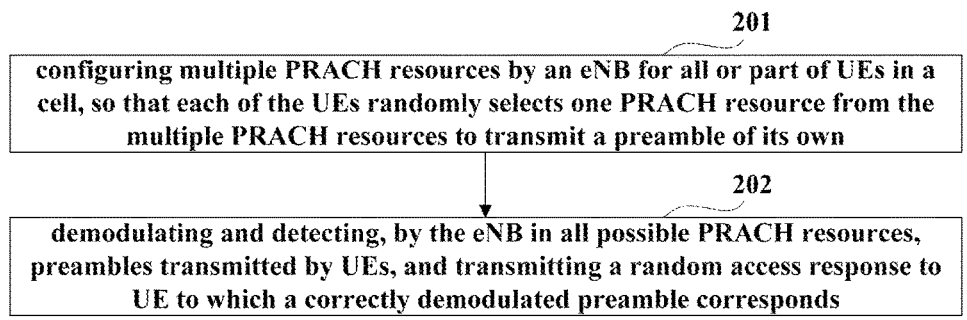
FIG. 2 is a flowchart of a random access method of Embodiment 2 of the present invention.

An embodiment of the present invention further provides a random access method, which is processing at an eNB side corresponding to the method of Embodiment 1, with contents identical to those of Embodiment 1 being not going to be described herein any further. FIG. 2 is a flowchart of the method of the present embodiment. Referring to FIG. 2, the method includes:

step 201: configuring multiple PRACH resources by an eNB for all or part of UEs in a cell, so that each of the UEs randomly selects one PRACH resource from the multiple PRACH resources to transmit a preamble of its own;

wherein, the multiple PRACH resources may be in the same TTI, and may also be in multiple different TTIs, and this embodiment is not limited thereto;

step 202: demodulating and detecting, by the eNB in all possible PRACH resources, preambles transmitted by UEs, and transmitting a random access response to UE to which a correctly demodulated preamble corresponds.

Corresponding to the former implementation of Embodiment 1, the eNB configures multiple PRACH resources for all or part of UEs in a cell to which it belongs, and transmits time frequency position information of such configuration to each UE via UE-specific signaling; or multiple defaulted PRACH resources are agreed at the eNB side and the UE side, wherein, the multiple PRACH resources configured by the eNB for each UE may be identical or different, and may have an intersection or have no intersection, and this embodiment is not limited thereto. In this way, the UE may randomly select one PRACH resource for transmitting the preamble therefrom, and transmit the preamble on a selected PRACH resource. Accordingly, after receiving the preambles transmitted by UEs, the eNB may demodulate and detect in all possible PRACH resources configured by it for the UEs, preambles transmitted by UEs, and transmit a random access response to UE to which a correctly demodulated preamble corresponds.

Corresponding to the latter implementation of Embodiment 1, the eNB may first group the UEs (all or part of the UEs) in the cell to which it belongs, and then allocate one or more PRACH resources for each group of UEs, that is, UEs in the same group use identical PRACH resources. Likewise, the time frequency position information of such configuration may also be transmitted to each UE via UE-specific signaling, or may be agreed by the eNB side and the UE side, wherein, the multiple PRACH resources configured by the eNB for each group of UEs may be identical or different, and may have an intersection or have no intersection; and the one PRACH resource configured by the eNB for each group of UEs may be identical or different, and this embodiment is not limited thereto. When the UE transmits the preamble, if the eNB allocates only one PRACH resource for the group to which the UE belongs, the UE transmits the preamble in the allocated PRACH resource; and if the eNB allocates multiple PRACH resources for the group to which the UE belongs, the UE may randomly select a PRACH resource from the multiple PRACH resources, and transmits the preamble on a selected PRACH resource.

With the method of this embodiment, the eNB configures the UE with one or more PRACH resources for transmitting a preamble, and the UE transmits the preamble in the one or more PRACH resources configured by the eNB for it, thereby solving the problem of high load pointed out in the Background; and the eNB is able to decide an amount of PRACH resources allocated by it for the UE as needed, thereby lowering a collision probability between different UEs.

Embodiment 3

Figure 3:
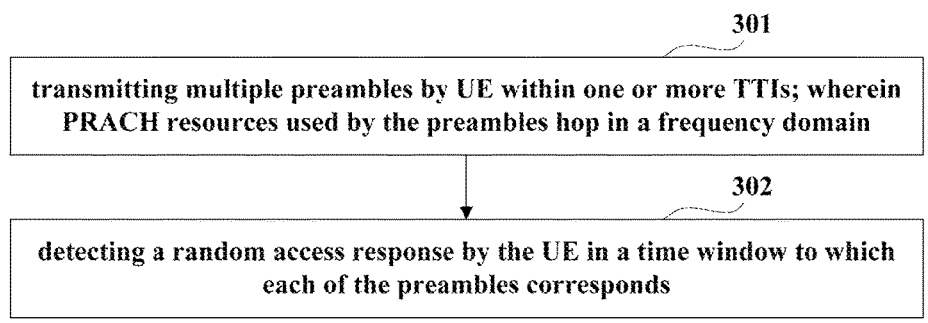
FIG. 3 is a flowchart of a random access method of Embodiment 3 of the present invention.

An embodiment of the present invention further provides a random access method. FIG. 3 is a flowchart of the method. Referring to FIG. 3, the method includes:

step 301: transmitting multiple preambles by UE within one or more TTIs; wherein PRACH resources used by the preambles hop in a frequency domain; and step 302: detecting a random access response by the UE in a time window to which each of the preambles corresponds.

In this embodiment, the eNB pre-configures the UE with the multiple PRACH resources, and the multiple PRACH resources may be in one TTI, and may also be in more TTIs. When the UE transmits the multiple preambles within one or more TTIs, the PRACH resources used by the multiple preambles hop in the frequency domain. In the time domain, the PRACH resources used by the multiple preambles may be in the same TTI, and may also be in different TTIs. When the PRACH resources are in the same TTI, the PRACH resources used by the multiple preambles hop in different frequency domains in the same time domain; and when the PRACH resources are in the different TTIs, the PRACH resources used by the multiple preambles hop in different frequency domains in different time domains.

Figure 4:
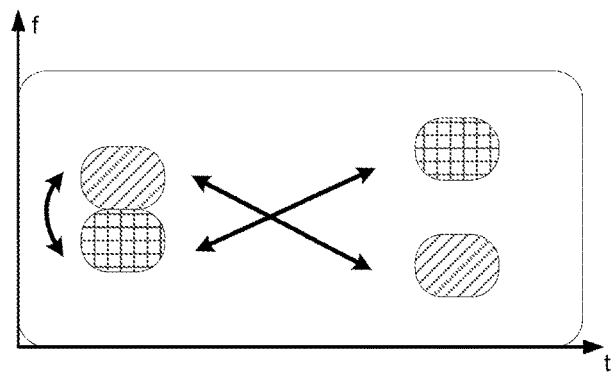
FIG. 4 is a schematic diagram of a hopping method.

For example, as shown in FIG. 4, when the PRACH resources used by the multiple preambles are in the same TTI, a first preamble occupies a PRACH resource #1 of a first slot, and a second preamble occupies a PRACH resource #2 of the first slot; when the PRACH resources used by the multiple preambles are in different TTIs, a first preamble occupies a PRACH resource #1 of a first slot, and a second preamble occupies a PRACH resource #2 of a second slot; and when the PRACH resources used by the multiple preambles may be in the same TTI and may also be in multiple TTIs, a first preamble occupies a PRACH resource #1 of a first slot, a second preamble occupies a PRACH resource #2 of the first slot, a third preamble uses a PRACH resource #1 of a second slot, and a four preamble occupies a PRACH resource #2 of the second slot. And as shown in FIG. 4, besides that the PRACH resources used by the preambles transmitted by each UE hop in the frequency domain, the PRACH resources that can be used by the UE and configured by the system may also hop with the change of time. For example, in a first PRACH slot, positions of frequency domain resources to be used are PRB group #2 and PRB group #3, and in a second PRACH slot, positions of frequency domain resources to be used are PRB group #1 and PRB group #4, etc.

It should be noted that what described above are examples only, and in particular implementation, any solution capable of carrying out that the PRACH resources used by the preambles hop in a frequency domain is covered by the protection scope of the present invention.

In this embodiment, the eNB may also configure the UE with a number of times of transmitting the preamble repetitively (i.e. the number of the preambles) and a manner of hopping of the PRACH resources used by the preambles in the frequency domain, so that the UE selects the PRACH resources used for transmitting the multiple preambles according to the manner of hopping. Wherein, a manner of configuration may be as described above, which may be transmitted via configuration signaling, and may also be defaulted and agreed by both parties, and this embodiment is not limited thereto.

In an implementation of this embodiment, the eNB may configure the PRACH resources and hopping manners for all or part of UEs in the cell to which it belongs. In another implementation of this embodiment, the eNB may first group all or part of UEs in the cell to which it belongs, and then configure the PRACH resources and hopping manners for different groups. Wherein, for different groups, the PRACH resources and the hopping manners may be identical or different, and may have an intersection or have no intersection.

In an implementation of this embodiment, after the UE transmits the preambles in step 301, a PDCCH needs to be monitored, so as to detect RAR in a time window to which each of the preambles corresponds in step 302, hence, in this embodiment, the UE calculates an RA-RNTI used for performing CRC attachment on a PDCCH according to a PRACH resource occupied by a last preamble in the transmitted multiple preambles to which the monitoring time windows correspond, and then performs CRC de-attachment on the PDCCH by using the RA-RNTI, so as to monitor the PDCCH.

For example, if the UE transmits the multiple preambles in one TTI, as one TTI corresponds to one time window, the UE may calculate the RA-RNTI by using the PRACH resource occupied by the last preamble in the multiple preambles, or calculate the RA-RNTI according to an established rule by using the PRACH resources occupied by one or some preambles in the multiple preambles, and then performs CRC de-attachment on the PDCCH by using the calculated RA-RNTI, so as to monitor the PDCCH, and detects in the time window whether there exists an RAR transmitted to it.

Figure 6:
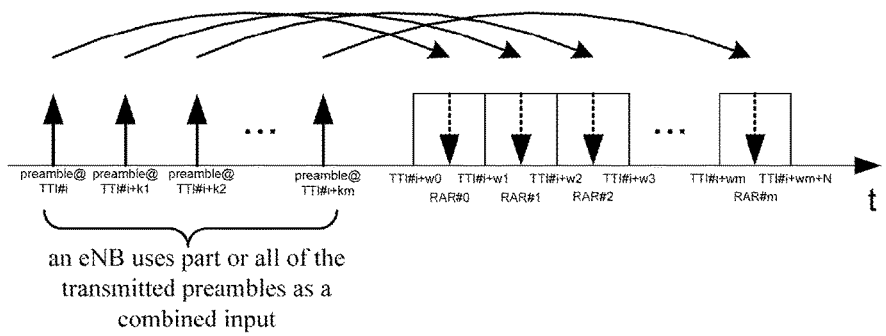
FIG. 6 is a schematic diagram of transmitting a preamble for multiple times by UE and demodulating the preamble by an eNB of an implementation.
Figure 7:
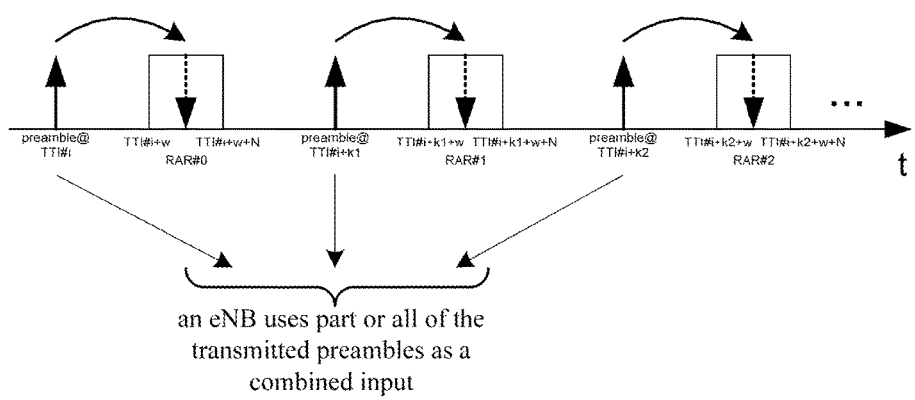
FIG. 7 is a schematic diagram of transmitting a preamble for multiple times by UE and demodulating the preamble by an eNB of another implementation.
Figure 8:
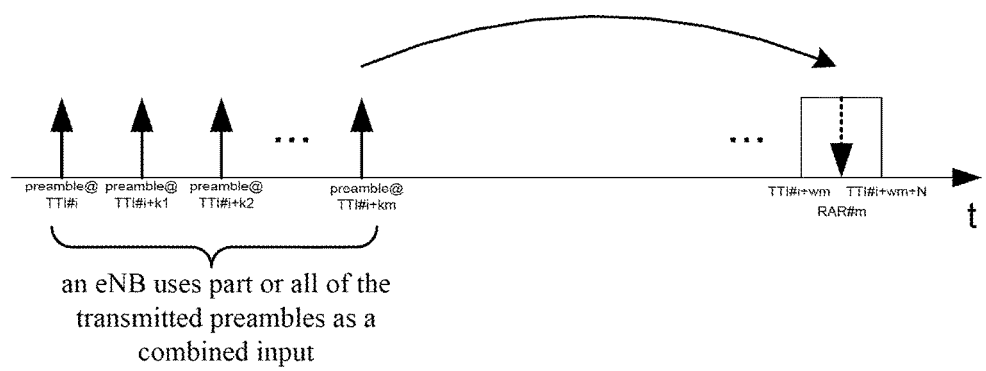
FIG. 8 is a schematic diagram of transmitting a preamble for multiple times by UE and demodulating the preamble by an eNB of a further implementation.

For another example, if the UE transmits the multiple preambles in multiple TTIs, and one preamble is transmitted in each TTI, as one TTI corresponds to one time window, the UE may calculate the RA-RNTI to which the TTI where the preamble is present corresponds by using the PRACH resource occupied by each of the preambles, and performs CRC de-attachment on the PDCCH by using the calculated RA-RNTI, so as to monitor the PDCCH, and detects in the time window whether there exists an RAR transmitted to it. In this example, the UE may detect an RAR in the time window to which the transmitted preamble corresponds while transmitting the preamble, and terminate transmission of subsequent preambles when it detects an RAR transmitted to it (as shown in FIG. 6); the UE may detect an RAR within a time window to which a preamble corresponds after transmitting the preamble, continue with transmission of subsequent preambles when no RAR transmitted to it is detected, and terminate transmission of subsequent preambles when an RAR transmitted to it is detected (as shown in FIG. 7); and the UE may also detect an RAR within a time window to which the preambles correspond after transmitting all the preambles, in this implementation, there is only one time window to which each preamble corresponds, as shown in FIG. 8, and the UE detects within the time window whether there exists an RAR transmitted to it.

With the method of this embodiment, the UE transmits the multiple preambles in a hopping manner (hopping in the frequency domain), which may make interference randomized, and the eNB uses the preambles that are transmitted multiple times for combining and counts energies, thereby improving performance of the eNB side in demodulating preambles.

Embodiment 4

Figure 5:
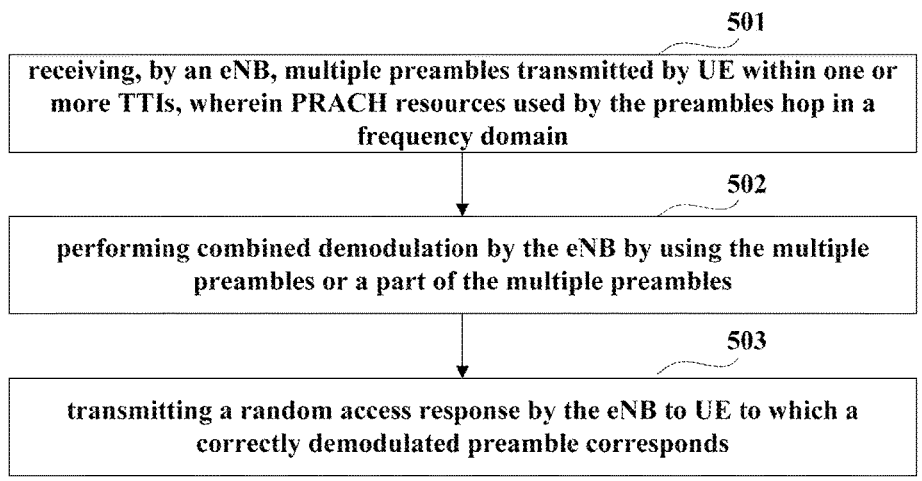
FIG. 5 is a flowchart of a random access method of Embodiment 4 of the present invention.

An embodiment of the present invention further provides a random access method, which is processing at an eNB side corresponding to the method of Embodiment 3, with contents identical to those of Embodiment 3 being not going to be described herein any further. FIG. 5 is a flowchart of the method. Referring to FIG. 5, the method includes:

step 501: receiving, by an eNB, multiple preambles transmitted by UE within one or more TTIs, wherein PRACH resources used by the preambles hop in a frequency domain;

step 502: performing combined demodulation by the eNB by using the multiple preambles or a part of the multiple preambles; and step 503: transmitting a random access response by the eNB to UE to which a correctly demodulated preamble corresponds.

In the existing LTE system standards, the eNB will transmit a random access response in subframes from n+3 to n+2+N in a time window; where, n is the first subframe number of the UE for transmitting preambles, and a value of N is configured for the UE at the eNB side, a maximum value of which being 10. That is, the UE will detect in at most ten subframes whether there exists a random access response (RA response) transmitted to it by the eNB. If no random access response transmitted to it is detected in the monitoring window, the UE subsequently retransmits the preamble. The random access response is carried via a PDSCH scheduled by a PDCCH, and an RA-RNTI is used to perform CRC attachment on the PDCCH, wherein, the RA-RNTI may be calculated according to position of a PRACH resource of the UE for transmitting preambles. Hence, the eNB side and the UE side will not misunderstand the RA-RNTI.

In this embodiment, the eNB may configure all or part of UEs in the cell with multiple PRACH resources for transmitting preambles, so that the UE transmits the multiple preambles according to the PRACH resources configured by the eNB. Furthermore, the eNB may configure all or part of UEs in the cell with hopping manners of the multiple PRACH resources for transmitting preambles, so that the UE transmits the multiple preambles according to the hopping manners and the multiple configured PRACH resources, wherein, a configuration manner may be as described above, which may be transmitted via configuration signaling, and may also be defaulted and agreed by the eNB side and the UE side.

In this embodiment, as described in Embodiment 3, the eNB may first group all or part of the UEs in the cell to which it belongs, and then configure each group of UEs with multiple PRACH resources. Furthermore, the eNB may configure each group of UEs with hopping manners of the multiple PRACH resources.

In an implementation of this embodiment, the eNB configures the UE with multiple PRACH resources for transmitting preambles, the multiple PRACH resources including the number of times of transmitting the preambles (i.e. the number of the preambles) and a hopping rule of the PRACH resources. In this implementation, after transmitting the multiple preambles, the UE will calculate an RA-RNTI used for performing CRC attachment on a PDCCH according to the PRACH resource (time domain position and frequency domain position) occupied by a last preamble in the preambles to which monitoring windows correspond, and then use the RA-RNTI to perform CRC de-attachment on a PDCCH, so as to monitor the PDCCH. If a PDCCH transmitted to it is monitored, a content carried by a PDSCH indicated by the PDCCH is a response to the random access of the UE, i.e. an RAR. Therefore, the UE may monitor within a corresponding time window whether there exists a random access response (RAR) transmitted to it. In this implementation, accordingly, after receiving the preambles transmitted by the UE, the eNB will use part or all of the preambles to perform combined demodulation, and transmit RAR to the UE to which a correctly demodulated preamble corresponds. In this embodiment, as described above, the RAR is carried by a PDSCH scheduled by a PDCCH, and the eNB calculates the RA-RNTI used for performing CRC attachment on a PDCCH according to the PRACH resource occupied by a last combined preamble.

In order that the methods of Embodiment 3 and this embodiment to be more clear and easy to be understood, the embodiments of the present invention shall be described below in detail with reference to FIGS. 6, 7 and 8.

As shown in FIG. 6, the UE transmits m+1 preambles in different TTIs, and the eNB may use all or part of them to perform preamble detection. If channel quality is poor, the preamble transmitted by the UE can only be detected by using all or multiple preambles transmitted by the UE; and if the channel quality is good, correct preamble may be detected by using part of or even one of the preambles. After detecting the preamble, the eNB transmits the RAR in corresponding time window. In this example, position and span of the time window may be calculated according to pre-configured related parameters. And wherein, the eNB may calculate the RA-RNTI according to the position of the PRACH resource occupied by a last preamble used by it (or, in other words, a latest received preamble), and use the RA-RNTI to perform CRC attachment on a PDCCH, so as to transmit the RAR in the PDSCH scheduled by the PDCCH.

As shown in FIG. 7, different from the implementation shown in FIG. 6, the eNB may use part or all of the received preambles to perform combined detection, and transmit the RAR after correctly demodulating, with a time sequence relationship and a RA-RNTI being similar to those of the implementation shown in FIG. 6. In this implementation, after receiving the RAR, the UE may terminate the transmission of the preambles.

As shown in FIG. 8, different from the two implementations (shown in FIGS. 6 and 7), the multiple preambles transmitted by the UE correspond to one time window. The UE calculates the RA-RNTI according to the PRACH resource occupied by the last preamble transmitted by it, or the UE calculates the RA-RNTI according to an established rule and the PRACH resources occupied by one or some of the multiple preambles transmitted by it. Accordingly, the eNB calculates the RA-RNTI according to the PRACH resource occupied by a last combined preamble.

With the method of this embodiment, the UE transmits the multiple preambles in a hopping manner (hopping in the frequency domain), which may make interference randomized, and the eNB uses the preambles that are transmitted multiple times for combining and counts energies, thereby improving performance of the eNB side in demodulating preambles.

An embodiment of the present invention further provides UE, as described in Embodiment 5 below. As the principle of the UE for solving problems is similar to that of the method of Embodiment 1, the implementation of the method of Embodiment 1 may be referred to for the implementation of the UE, and the repeated parts shall not be described herein any further.

Embodiment 5

Figure 9:
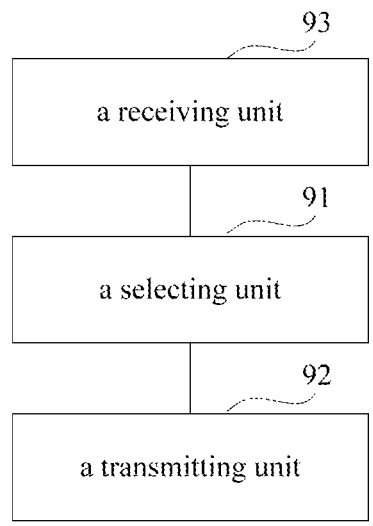
FIG. 9 is a schematic diagram of a structure of UE of Embodiment 5 of the present invention.

An embodiment of the present invention provides UE, applicable to performing random access. FIG. 9 is a schematic diagram of a structure of the UE. Referring to FIG. 9, the UE includes:

a selecting unit 91 configured to randomly select a physical random access channel (PRACH) resource for transmitting a preamble from multiple PRACH resources pre-configured by an eNB for the UE; and a transmitting unit 92 configured to transmit the preamble on the PRACH resource selected by the selecting unit 91, so that the eNB transmits a random access response to UE to which a correctly demodulated preamble corresponds according to preambles transmitted by UEs.

In this embodiment, the multiple PRACH resources may be in the same TTI, and may also be in multiple TTIs, and this embodiment is not limited thereto.

In an implementation, the UE further includes:

a receiving unit 93 configured to receive UE-specific signaling transmitted by the eNB, the UE-specific signaling including time frequency position information of the multiple PRACH resources configured by the eNB for the UE.

With the UE of this embodiment, the UE transmits the preamble in the multiple PRACH resources allocated by the eNB for it, thereby solving the problem of high load pointed out in the Background; and the eNB is able to decide an amount of PRACH resources allocated by it for the UE as needed, thereby lowering a collision probability between different UEs.

Another implementation of this embodiment further provides UE. This UE excludes the selecting unit 91 described above, but includes a receiving unit 93 and a transmitting unit 92. In this implementation, the receiving unit 93 receives UE-specific signaling transmitted by an eNB, the UE-specific signaling including time frequency position information of one PRACH resource pre-configured by the eNB for the UE, and the transmitting unit 92 is configured to transmit a preamble on the PRACH resource configured by the eNB for the UE.

An embodiment of the present invention further provides an eNB, as described in Embodiment 6 below. As the principle of the eNB for solving problems is similar to that of the method of Embodiment 2, the implementation of the method of Embodiment 2 may be referred to for the implementation of the eNB, and the repeated parts shall not be described herein any further.

Embodiment 6

Figure 10:
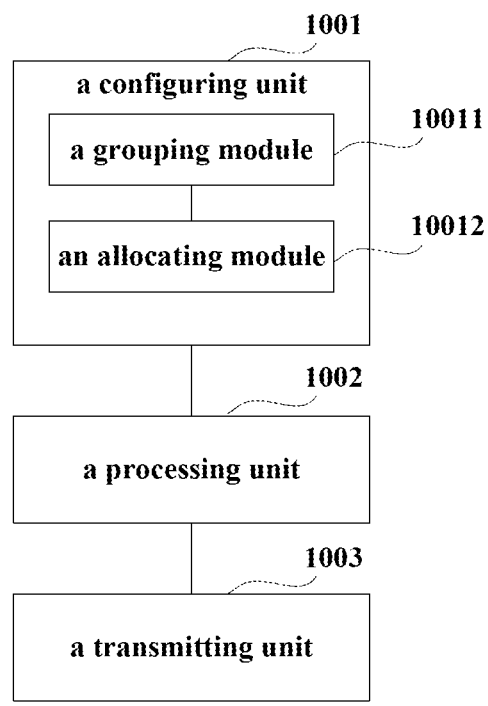
FIG. 10 is a schematic diagram of a structure of an eNB of Embodiment 6 of the present invention.

An embodiment of the present invention provides an eNB, applicable to controlling random access. FIG. 10 is a schematic diagram of a structure of the eNB. Referring to FIG. 10, the eNB includes:

a configuring unit 1001 configured to configure multiple PRACH resources for all or part of UEs in a cell to which the eNB belongs, so that each of the UEs randomly selects one of the multiple PRACH resources to transmit a preamble of its own; and a processing unit 1002 configured to demodulate and detect preambles transmitted by the UEs in all possible PRACH resources configured by the configuring unit 1001 for the UEs; and a transmitting unit 1003 configured to transmit a random access response to UE to which a preamble correctly demodulated by the processing unit 1002 corresponds.

In an implementation, the configuring unit 1001 may include:

a grouping module 10011 configured to group all or part of UEs in the cell to which the eNB belongs; and an allocating module 10012 configured to allocate one or multiple PRACH resources for each group of UEs grouped by the grouping module, so that the UE randomly selects one from the one or the multiple PRACH resources to transmit the preamble of its own.

In an implementation, the transmitting unit 1003 is further configured to transmit time frequency position information of the multiple PRACH resources configured by the configuring unit 1001 for each UE to the UE via UE-specific signaling.

In another implementation, the configuring unit 1001 may further configure one PRACH resource for each group of UEs, and at this moment, the transmitting unit 1003 may further transmit time frequency position information of the PRACH resource configured by the configuring unit for each group of UEs to the UEs via UE-specific signaling. Wherein the one or multiple PRACH resources configured for each UE or each group of UEs is/are identical or different.

By configuring multiple PRACH resources for transmitting preambles for the UE by the eNB of this embodiment, the problem of high load pointed out in the Background is solved; and the eNB is able to decide an amount of PRACH resources allocated by it for the UE as needed, thereby lowering a collision probability between different UEs.

An embodiment of the present invention further provides UE, as described in Embodiment 7 below. As the principle of the UE for solving problems is similar to that of the method of Embodiment 3, the implementation of the method of Embodiment 3 may be referred to for the implementation of the UE, and the repeated parts shall not be described herein any further.

Embodiment 7

Figure 11:
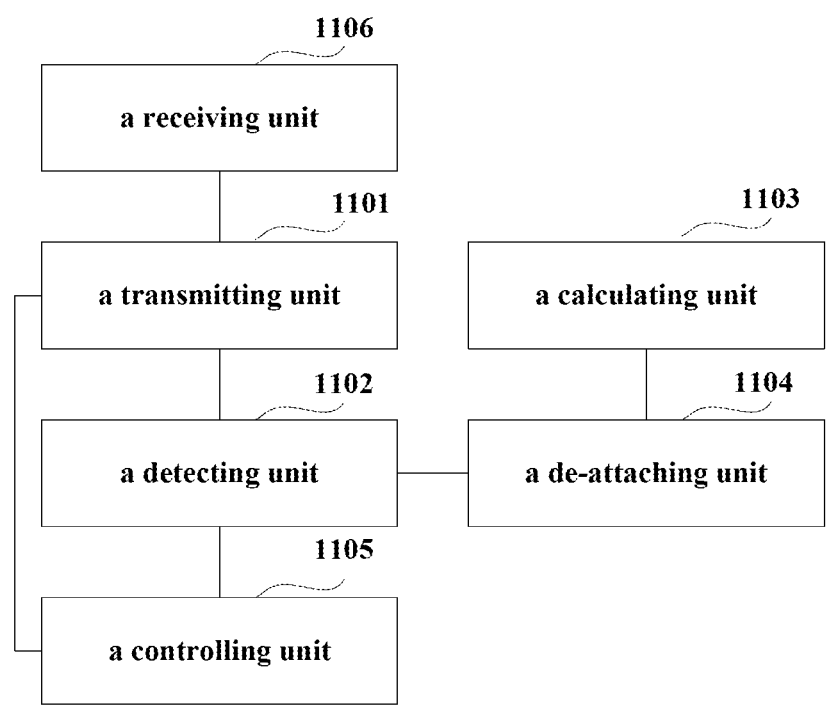
FIG. 11 is a schematic diagram of a structure of UE of Embodiment 7 of the present invention.

An embodiment of the present invention provides UE, applicable to performing random access. FIG. 11 is a schematic diagram of a structure of the UE. Referring to FIG. 11, the UE includes:

a transmitting unit 1101 configured to transmit multiple preambles within one or more TTIs, wherein PRACH resources used by the preambles hop in a frequency domain; and a detecting unit 1102 configured to detect a random access response in a time window to which each of the preambles corresponds.

In an implementation, the UE further includes:

a calculating unit 1103 configured to calculate an RA-RNTI for performing CRC attachment on a PDCCH according to a PRACH resource occupied by a last preamble in the preambles in time windows to which the TTIs correspond; and a de-attaching unit 1104 configured to perform CRC de-attachment on a PDCCH according to the RA-RNTI calculated by the calculating unit 1103, so that the detecting unit 1102 may detect the random access response in a time window to which each of the preambles corresponds.

In an implementation, the UE further includes:

a controlling unit 1105 configured to control the transmitting unit 1101 to terminate transmission of subsequent preambles if the detecting unit 1102 detects a random access response in a time window to which a preamble corresponds.

In an implementation, the UE further includes:

a receiving unit 1106 configured to receive configuration signaling transmitted by the eNB, the configuration signaling including time frequency position information of the multiple PRACH resources configured by the eNB for the UE, hopping manners of the PRACH resources and the number of the transmitted preambles.

By transmitting the multiple preambles in a hopping manner (hopping in the frequency domain) by the UE of the present embodiment, interference may be made randomized, and the eNB uses the preambles that are transmitted multiple times for combining and counts energies, thereby improving performance of the eNB side in demodulating preambles.

An embodiment of the present invention further provides an eNB, as described in Embodiment 8 below. As the principle of the eNB for solving problems is similar to that of the method of Embodiment 4, the implementation of the method of Embodiment 4 may be referred to for the implementation of the eNB, and the repeated parts shall not be described herein any further.

Embodiment 8

Figure 12:
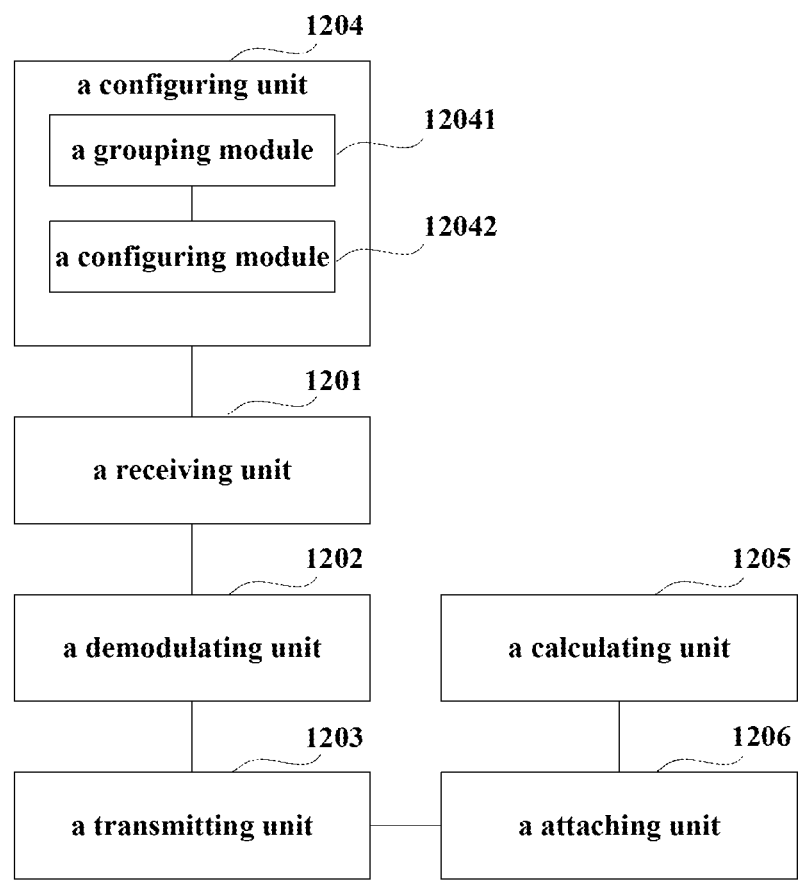
FIG. 12 is a schematic diagram of a structure of an eNB of Embodiment 8 of the present invention.

An embodiment of the present invention provides an eNB, applicable to controlling performing random access. FIG. 12 is a schematic diagram of a structure of the eNB. Referring to FIG. 12, the eNB includes:

a receiving unit 1201 configured to receive multiple preambles transmitted by UE within one or more TTIs, wherein PRACH resources used by the preambles hop in a frequency domain;

a demodulating unit 1202 configured to perform combined demodulation by using the multiple preambles received by the receiving unit or a part of the multiple preambles; and a transmitting unit 1203 configured to transmit a random access response to UE to which a preamble correctly demodulated by the demodulating unit corresponds.

In an implementation, the eNB further includes:

a configuring unit 1204 configured to configure PRACH resources for transmitting preambles for all UE in a cell, so that the UE transmits the multiple preambles according to the PRACH resources configured by the eNB.

In this implementation, the PRACH resources are multiple PRACH resources in one TTI or multiple PRACH resources in multiple TTIs.

In this implementation, the configuring unit 1204 may further configure hopping manners of the PRACH resources for the UE.

In an embodiment of this implementation, the transmitting unit 1203 is further configured to transmit configuration signaling to the UE, the configuration signaling including time frequency position information of multiple PRACH resources configured by the configuring unit 1204 for each UE and hopping manners of the multiple PRACH resources.

In an implementation, the configuring unit 1204 further includes:

a grouping module 12041 configured to group all or part of the UEs in the cell to which the eNB belongs; and a configuring module 12042 configured to configure identical PRACH resources for each group of UEs grouped by the grouping module.

In an implementation, the eNB further includes:

a calculating unit 1205 configured to calculate an RA-RNTI for performing CRC attachment on a PDCCH according to a PRACH resource used by a last combined preamble; and a attaching unit 1206 configured to perform CRC attachment on a PDCCH by using the RA-RNTI calculated by the calculating unit 1205, so that the transmitting unit 1203 transmits the random access response via a PDSCH scheduled by the PDCCH.

With the eNB of this embodiment, the UE transmits the multiple preambles in a hopping manner (hopping in the frequency domain), interference may be made randomized, and the eNB uses the preambles that are transmitted multiple times for combining and counts energies, thereby improving performance of the eNB side in demodulating preambles.

An embodiment of the present invention further provides a communication system, including the UE as described in Embodiment 5 and the eNB as described in Embodiment 6, or including the UE as described in Embodiment 7 and the eNB as described in Embodiment 8.

An embodiment of the present invention further provides a computer-readable program, wherein when the program is executed in terminal equipment, the program enables a computer to carry out the random access method as described in Embodiment 1 or 3 in the terminal equipment.

An embodiment of the present invention further provides a storage medium in which a computer-readable program is stored, wherein the computer-readable program enables a computer to carry out the random access method as described in Embodiment 1 or 3 in terminal equipment.

An embodiment of the present invention further provides a computer-readable program, wherein when the program is executed in an eNB, the program enables a computer to carry out the random access method as described in Embodiment 2 or 4 in the eNB.

An embodiment of the present invention further provides a storage medium in which a computer-readable program is stored, wherein the computer-readable program enables a computer to carry out the random access method as described in Embodiment 2 or 4 in an eNB.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A User equipment (UE), applicable to performing random access, the UE comprising:
   a memory that stores a plurality of instructions; and
   a processor coupled to the memory and configured to execute the instructions to:
   randomly select a PRACH resource for transmitting a preamble from multiple PRACH resources pre-configured by an eNB for the UE; and
   transmit the preamble on the selected PRACH resource, so that the eNB transmits a random access response to UE to which a correctly demodulated preamble corresponds according to preambles transmitted by UEs,
   wherein, the multiple PRACH resources pre-configured by the eNB hop in a frequency domain within multiple transmission time,
   wherein the processor is further configured to execute the instructions to:
   calculate an RA-RNTI for performing CRC attachment on a PDCCH according to a PRACH resource occupied by the preamble; and
   perform CRC de-attachment on a PDCCH according to the calculated RA-RNTI, so that the random access response is detected in a time window to which the preamble corresponds.

2. The UE according to claim 1, wherein
   the processor is configured to execute the instructions to:
   receive UE-specific signaling transmitted by the eNB, the UE-specific signaling comprising time frequency position information of the multiple PRACH resources configured by the eNB for the UE.

3. An eNB, applicable to controlling random access, the eNB comprising:
   a memory that stores a plurality of instructions; and
   a processor coupled to the memory and configured to execute the instructions to:
   configure multiple PRACH resources for all or part of UEs in a cell to which the eNB belongs, so that each of the UEs selects one of the multiple PRACH resources to transmit a preamble of its own;
   demodulate and detect the preambles transmitted by the UEs in all possible PRACH resources configured for the UEs; and
   transmit a random access response to UE to which a correctly demodulated preamble corresponds, wherein, the multiple PRACH resources configured by the eNB hop in a frequency domain within multiple transmission time,
   wherein the processor is further configured to execute the instructions to:
   calculate an RA-RNTI for performing CRC attachment on a PDCCH according to a PRACH resource used by a last combined preamble;
   perform CRC attachment on a PDCCH by using the RA-RNTI; and
   transmit the random access response by using a PDSCH scheduled by the PDCCH.

4. The eNB according to claim 3, wherein the processor is configured to execute the instructions to:
   group all or part of UEs in the cell to which the eNB belongs; and
   allocate multiple PRACH resources for each group of UEs, so that the UE randomly selects one PRACH resource from the multiple PRACH resources to transmit the preamble of its own.

5. The eNB according to claim 3, wherein the processor is further configured to execute the instructions to:
   transmit UE-specific signaling to the UE, the UE-specific signaling comprising time frequency position information of multiple PRACH resources configured for the UE;
   and wherein the multiple PRACH resources configured for each UE or each group of UEs are identical or different.

6. A User equipment (UE), applicable to performing random access, the UE comprising:
   a memory that stores a plurality of instructions; and
   a processor coupled to the memory and configured to execute the instructions to:
   transmit multiple preambles within multiple transmission time, wherein PRACH resources used by the preambles hop in a frequency domain; and
   detect a random access response in a time window to which each of the preambles corresponds, wherein the PRACH resources used by the preambles are pre-configured by an eNB, wherein the processor is further configured to execute the instructions to:
   calculate an RA-RNTI for performing CRC attachment on a PDCCH according to a PRACH resource occupied by a last preamble in transmitted multiple preambles in the transmission time; and
   perform CRC de-attachment on a PDCCH according to the calculated RA-RNTI, so that the random access response is detected in a time window to which each of the preambles corresponds.

7. The UE according to claim 6, wherein the processor is further configured to execute the instructions to:
   control to terminate transmission of subsequent preambles if a random access response is detected in a time window to which a preamble corresponds.

8. An eNB, applicable to controlling random access, the eNB comprising:
   a memory that stores a plurality of instructions; and
   a processor coupled to the memory and configured to execute the instructions to:

receive multiple preambles transmitted by UE within multiple transmission time, wherein PRACH resources used by the preambles hop in a frequency domain;

perform combined demodulation by using the received multiple preambles or a part of the multiple preambles; and transmit a random access response to UE to which a correctly demodulated preamble corresponds, wherein the processor is further configured to execute the instructions to:

configure PRACH resources for transmitting preambles, so that the UE transmits the multiple preambles according to the PRACH resources configured by the eNB, calculate an RA-RNTI for performing CRC attachment on a PDCCH according to a PRACH resource used by a last combined preamble;

perform CRC attachment on a PDCCH by using the RA-RNTI; and transmit the random access response by using a PDSCH scheduled by the PDCCH.

9. The eNB according to claim 8, wherein the processor is further configured to execute the instructions to:

transmit configuration signaling to the UE, the configuration signaling comprising time frequency position information of multiple PRACH resources configured for the UE and corresponding to the multiple preambles, and hopping manners of the multiple PRACH resources.

10. The eNB according to claim 8, wherein the processor is further configured to execute the instructions to:

group all or part of the UEs in a cell to which the eNB belongs; and configure identical PRACH resources for each group of UEs.

11. An eNB, applicable to controlling random access, the eNB comprising:

a memory that stores a plurality of instructions; and a processor coupled to the memory and configured to execute the instructions to:

receive multiple preambles transmitted by UE within multiple transmission time, wherein PRACH resources used by the preambles hop in a frequency domain;

perform combined demodulation by using the received multiple preambles or a part of the multiple preambles; and transmit a random access response to UE to which a correctly demodulated preamble corresponds, wherein the processor is configured to execute the instructions to:

calculate an RA-RNTI for performing CRC attachment on a PDCCH according to a PRACH resource used by a last combined preamble;

perform CRC attachment on a PDCCH by using the RA-RNTI; and transmit the random access response by using a PDSCH scheduled by the PDCCH.

* * * * *